Feb. 16, 1943.    W. N. ALLYN    2,311,502
OPHTHALMOSCOPE
Filed Jan. 21, 1941    2 Sheets-Sheet 2
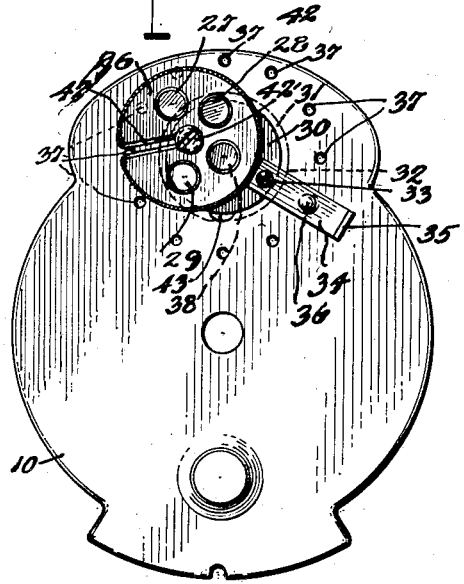
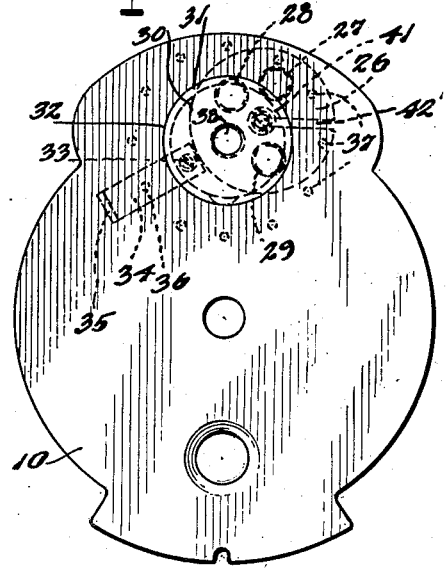
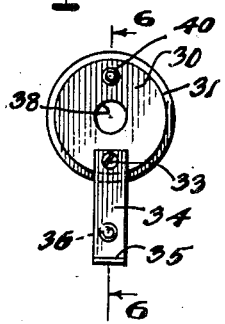
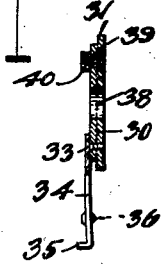
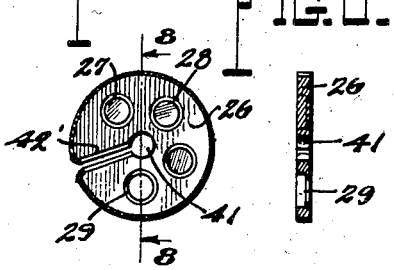
Inventor
W. N. Allyn
By Robert Cobb
Attorneys Patented Feb. 16, 1943

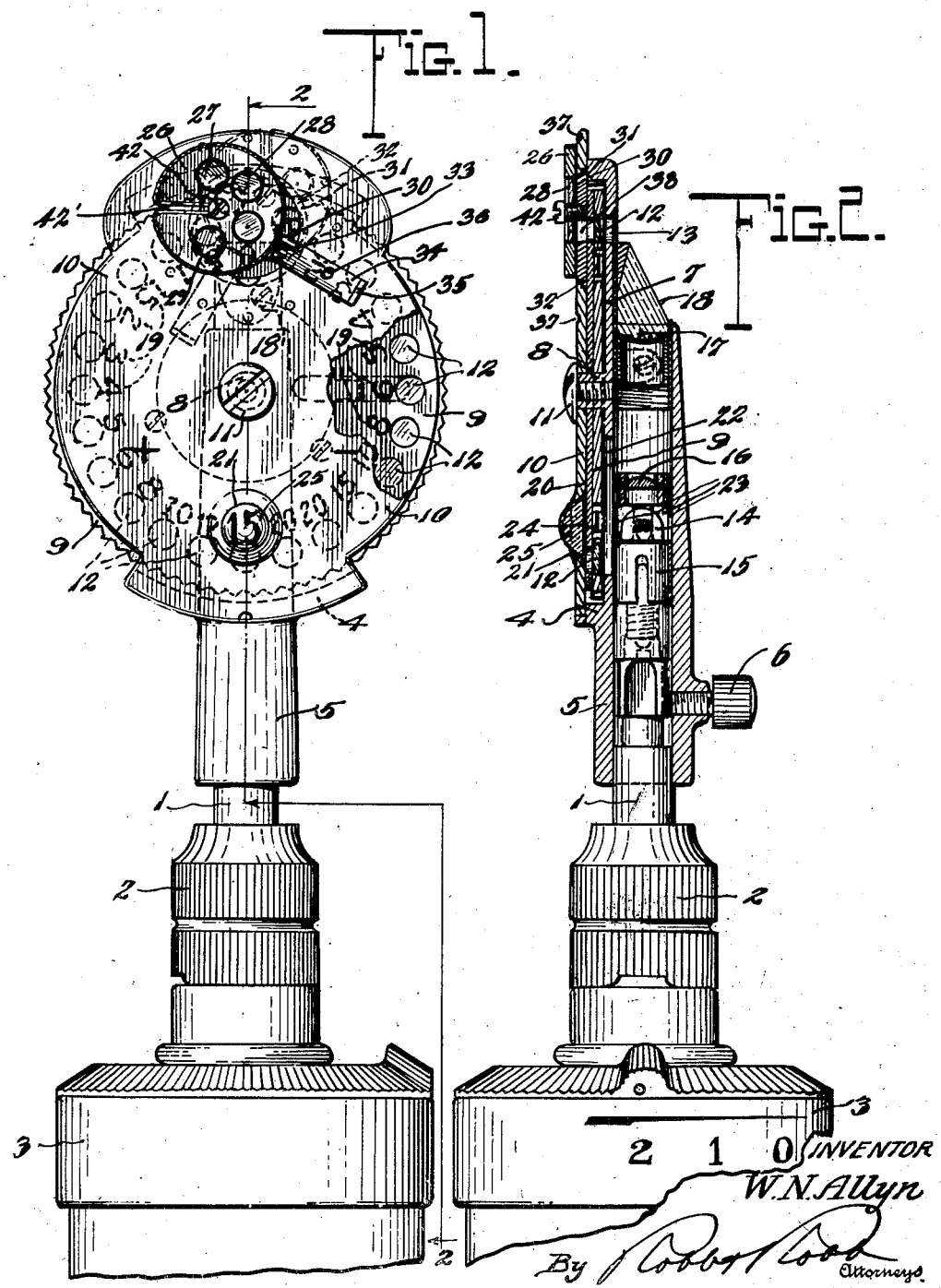

2,311,502

UNITED STATES PATENT OFFICE 2,311,502

OPHTHALMOSCOPE

William N. Allyn, Skaneateles, N. Y.

Application January 21, 1941, Serial No. 375,343

5 Claims. (Cl. 88—22)

This invention appertains to improvements in instruments used for examination of the eye, and more particularly to an ophthalmoscope having provision for neutralizing astigmatic errors to thereby permit more complete and accurate examination of the eye.

While my invention may be applied to practically any type of ophthalmoscope, it is herein illustrated and described in conjunction with the more modern type, such as is disclosed in my prior Patent No. 2,027,663, granted January 14, 1936. In that ophthalmoscope, there is provided a rotary lens carrier, the lenses of which are selectively registrable with a sight opening in the supporting frame which also supports the usual light ray projecting system which serves to direct a small beam of light into the eye of the subject under examination by the observer, and also to illuminate the indices on the rotary lens carrier which identify the respective lenses.

Notwithstanding the highly developed character and exceptionally high efficiency of my prior ophthalmoscope, it has been found that it will not always assure complete and perfect examination of the eye, particularly the retina, in those cases where astigmatism is substantially pronounced. This is due to the fact that the light rays directed into the eye from the ophthalmoscope cannot be brought to a common focus on the retina with the sole aid of the lenses in the rotary carrier of the ophthalmoscope, which lenses are usually of the spherical type.

Accordingly, it is the primary object of the present invention to provide auxiliary appliances for the ophthalmoscope which will neutralize the astigmatic error inherent in the eye where the same is present.

In carrying out the aforementioned object, I preferably provide an auxiliary lens system employing one or more cylindrical lenses which are so mounted that their respective axes may be suitably adjusted to the angle corresponding to the astigmatic correction necessary to be made for the particular circumstances encountered.

More particularly, my invention has for one of its objects the provision of an auxiliary rotary lens carrier preferably carrying a plurality of cylindrical lenses, and a special mounting for said auxiliary carrier by means of which the axis of each of its lenses may be angularly adjusted relative to the eye through any predetermined angle while in selective register with the sight opening in the ophthalmoscope frame.

Other objects and advantages of the invention will be hereinafter described and the novel features thereof defined in the appended claims.

In the drawings:

Figure 1 is a view in elevation, on an enlarged scale, of an ophthalmoscope embodying my invention, as seen from the observer's side, a portion of the frame being broken away to exposed the main rotary lens carrier;

Figure 2 is a vertical sectional view taken on the line 2—2 of Figure 1;

Figure 3 is a view in elevation of the cover plate of the ophthalmoscope frame to which the auxiliary rotary lens carrier is attached by means of a special angularly adjustable mounting which is shown in one position of its adjustment;

Figure 4 is a view from the reverse side of the parts shown in Figure 3;

Figure 5 is a detail elevational view of the adjustable mounting for the auxiliary lens carrier;

Figure 6 is a sectional view taken on the line 6—6 of Figure 5;

Figure 7 is a detail elevational view of the auxiliary lens carrier; and

Figure 8 is a sectional view taken on the line 8—8 of Figure 7.

Like reference characters designate corresponding parts in the several figures of the drawings, wherein 1 denotes a lamp supporting spindle having a coupling 2 affixed to its lower end for attachment of the same to a battery handle 3, or some other suitable source of electrical current supply, the details of which are immaterial to this invention. Attached to the spindle 1 is a frame 4, which includes a cylindrical portion 5 which receives the spindle 1 and to which the frame is removably attached by means of the set screw 6. At the front side of the tubular portion 5, that is the observer's side, is an upright, stationary plate 7 having a central annular boss 8 on which is rotatably mounted a main lens carrier 9. A front cover plate 10 is removably attached to the frame by means of the screw 11 threadedly received in the boss 8 of the frame plate 7.

The lens carrier 9 is free to rotate on the boss 8 between the plates 7 and 10, and carries adjacent to its periphery a plurality of equally spaced spherical lenses 12, which are selectively registrable with a sight opening 13 extending from front to back through the frame near the upper end of the latter.

Carried by the spindle 1 and disposed within the tubular portion 5 of the ophthalmoscope frame is a small but powerful electric lamp 14 over which is positioned a ferrule 15 having mounted in its upper end a condenser lens 16. Mounted in the upper end of the tubular part 5, above the lamp 14, is a prism 17 through which the light rays from the lamp 14 are projected. As the light rays pass through the prism 17, they are refracted and emerge from the rear face 18 of the prism in a direction generally parallel to and just below the axis of the sight opening 13, so that as the observer looks through the sight opening 13 into the eye of the subject under examination, the eye will be illuminated by the light rays in a manner now well known.

To facilitate identification of the respective lenses 12 as they are selectively brought into registration with the sight opening 13, there is associated with each lens an index 19, which is preferably arranged so as to be visible from the observer's side of the ophthalmoscope. According to the form of the ophthalmoscope illustrated in the drawings, the indices 19 are borne by a translucent dial 20 fixed to the lens carrier 9 for rotation therewith, so that the indices will be selectively registrable with an opening 21 in the cover plate 10. A portion of the light emitted by the lamp 14 is directed through the translucent index dial 20, thereby assuring plain visibility of the indices irrespective of the darkness and/or shadows occurring during the use of the ophthalmoscope. To this end, the plate 7 is slotted at 22, and the ferrule 15 is also diametrically slotted at 23. Registering with these slots 22 and 23, and disposed in the rotary lens carrier 9, opposite each index on the translucent dial 20, is one or more small openings 24 to permit the light rays to pass through the translucent dial and thereby illuminate the corresponding index as it is brought into register with the opening 21 in the cover plate 10. To facilitate reading of the indices on the dial 20, a magnifying lens 25 is preferably mounted in the opening 21.

The construction of the ophthalmoscope as described above more or less generally conforms to that disclosed in my prior patent hereinbefore referred to. It is to be understood, however, that the description is intended to be merely illustrative of one practical form of ophthalmoscope to which my invention may be applied, and is not intended as limiting the invention to the precise details shown and described herein. It will be obvious that the general features of the ophthalmoscope may be changed in many respects without materially affecting the utility of the present invention, and this particularly in the type of illuminating system employed, and which may have the form of a mirror and lens system as distinguished from the prism system described above.

Passing now to the principal feature of my invention, and referring particularly to Figures 3 to 8 inclusive, 26 designates an auxiliary rotary lens carrier having at least one, and preferably several, lens openings 27 provided therein, in each of which is mounted a cylindrical lens 28, as distinguished from the spherical lenses 12 disposed in the main lens carrier 9. The number of lenses with which the auxiliary carrier 26 is provided may be varied as desired, but, for all practical purposes, it will be usually found sufficient to provide one lens of +3 diopter, one of +5 diopter, and one of −3 diopter. In addition to the lens openings 27, I also provide in the auxiliary lens carrier 26 a blank opening 29 having no lens therein, for reasons which will hereinafter become apparent. The openings 27 and 29 are equally spaced at a uniform distance from the central axis of the auxiliary carrier 26, and the carrier 26 is so mounted on the cover plate 10 of the ophthalmoscope frame 4 that the lenses 28 and the opening 29 are selectively registrable with the sight opening 13 at the upper end of the frame. Moreover, by means of a special mounting for the auxiliary lens carrier 26, the axis of each cylindrical lens 28 is angularly adjustable relative to the central axis of the sight opening 13, and consequently to the axis of the eye under observation, in a plane normal to the latter axis. To this end, the mounting for the auxiliary lens carrier 26 comprises a circular disc 30 having a circumferential annular flange 31 extending thereabout, the thickness of the flange 31 being somewhat less than the total thickness of the disc 30. Coaxial with the sight opening 13 in the plate 7 of the ophthalmoscope frame 4 is an enlarged opening in the cover plate 10, which opening receives the disc 30, as will be best understood from Figure 2. At the rear or inner side of the cover plate 10, this opening is enlarged to correspond with the annular flange 31 on the disc 30, and thereby form a shoulder 32 to prevent the disc 30 from becoming displaced after it has been disposed in its opening. The disc 30 is free to rotate in the opening in the cover plate 10, and in order to permit rotation to be imparted to the disc 30, there is attached thereto, as at 33, an arm 34 having an offset finger piece 35 on the free extremity thereof. The operating arm 34 map be composed of any relatively stiff, though somewhat resilient, material, and is provided adjacent to its free extremity with a detent 36 for selective engagement with a series of circularly-arranged, equally-spaced recesses 37 formed in the outer face of the cover plate 10. An opening 38 is provided centrally through the disc 30, and when the disc 30 is mounted in the cover plate 10 this opening 38 is always in register with the sight opening 13 in the ophthalmoscope frame.

The auxiliary lens carries 26 is rotatably mounted on the disc 30 in such a position that the central axis of the carrier is displaced from the central axis of the disc 30 in an amount equal to the distance from the central axis of the auxiliary carrier to the center of the respective lenses 28 and openings 27, 29. The attachment of the auxiliary carrier 26 to the disc 30 may be made in any suitable manner, such as for example, by providing an opening 39 in the disc 30 and affixing therein an internally threaded bearing sleeve 40 which projects beyond the outer face of the disc 30 for a distance at least equal to or slightly greater than the thickness of the auxiliary carrier 26. The carrier 26 is provided with a central opening 41 in which the projecting portion of the bearing sleeve 40 is received, and a screw 42 engaging the interior threads in the sleeve 40 serves to prevent displacement of the auxiliary carrier from the sleeve. By selectively rotating the auxiliary carrier 26 about its own axis, the lenses 28 and opening 29 may be selectively brought into register with the central opening 38 in the disc 30, which in turn is always in register with the sight opening 13 in the ophthalmoscope frame. Any suitable means may be employed to facilitate selective registration of the auxiliary lenses in carrier 26 and/or to prevent accidental displacement of the auxiliary carrier from its various positions of registry of the respective lenses 23 and opening 29 with the central opening 38 in the disc 30. The means for accomplishing the former result is exemplified in the drawings by a slot 42' provided in the auxiliary carrier 26 for engagement with the finger-nail of the user's hand. A detent (not shown) may be employed, if desired, to accomplish the latter result. Also, if desired, the auxiliary lens carrier may be substantially enclosed in a suitable housing provided on the outer face of the cover plate 10, but the use of such a housing is not essential to the invention.

In order to permit assembly of the disc 30 in its opening in the cover plate 10, while the operating lever 34 is fixed to the disc, the cover plate is preferably notched at 43 so as to afford sufficient clearance for the operating lever in seating the flange 31 of the disc 30 against the shoulder 32.

In the use of the opthalmoscope embodying the features hereinbefore described, the same technique may be employed as is customarily followed and described in my prior patent hereinabove referred to. In those cases where no astigmatic correction or neutralization is required, the auxiliary lens carrier 26 should be adjusted on its own axis to bring the plain or blank opening 29 into register with the opening 38 in the disc 30 and the sight opening 13, permitting the observer to view the illuminated area of the eye with the aid of only the spherical lenses 12 on the main lens carrier 9, which latter may be selectively registered with the sight opening 13 by suitable manipulation of the notched edge 44 of the main lens carrier which projects somewhat beyond the outer margins of the spaced plates 7 and 10 which form a part of the opthalmoscope frame.

If the condition of the eye under observation necessitates correction for astigmatic error, then the auxiliary lens carrier 26 can be used to considerable advantage by rotatively adjusting the auxiliary lens carrier 16 to register one of the cylindrical lenses 28 of the correct power with the opening 38 in the disc 30 and the sight opening 13, and then manipulating the operating lever 34 to bodily shift the auxiliary lens carrier 26 and the selected lens 28 through an angle in a plane generally normal to the axis of the eye until the axis of the cylindrical lens 28 assumes a position corresponding to the desired astigmatic correction. During this angular adjustment of the axis of the cylindrical lens 28, as performed by manipulating the operating lever 34, the registration of the lens 28 with the opening 38 in the disc 30 and with the sight opening 13, will not be disturbed. As clearly shown in the drawings, the angular adjustment just referred to may be accomplished over a range of 360°. While the recesses 37 have been illustrated on an equal spacing of 30°, this spacing may be increased or diminished, as preferred, and additional intermediate recesses added, if desired, to correspond with any preferred range and/or accuracy of adjustment. A scale, not shown, may be delineated on the face of the cover plate 10 for convenience of identifying the angular positions of adjustment of the respective axes of the cylindrical lenses 28, where such is desired.

It should also be understood from the foregoing that the auxiliary lens carrier 26 may be used independently of the spherical lenses 12 in the main lens carrier 9, which latter carrier is usually provided with at least one blank opening which may be brought into registry with the sight opening 13.

While the specific details have been herein shown and described, the invention is not confined thereto, as changes and alterations may be made without departing from the spirit thereof as defined by the appended claims.

What I claim as new and desire to secure by Letters Patent is:

1. In an ophthalmoscope having a frame provided with a sight opening therein, a rotary lens carrier disc centrally mounted on the frame at one side thereof and carrying a plurality of spherical lenses selectively registrable with the sight opening in the frame on rotation of the lens carrier disc, illuminating means mounted on the opposite side of the frame, said illuminating means including reflector means for directing the light in the form of a beam onto the subject under examination, in the general line of vision through the sight opening, a cover plate secured to the frame over the lens carrier disc, with the latter disc disposed for free rotation between the cover plate and the frame, said cover plate having a circular opening therein arranged coaxially respecting the sight opening in the frame, a circular support rotatably mounted in said cover plate opening and having a central sight opening therein aligned with the sight opening in the frame, an auxiliary lens carrier disc rotatably mounted on the circular support with its axis of rotation arranged at a distance to one side of the central axis of rotation of said circular support, said auxiliary lens carrier disc being provided with a plurality of cylindrical lenses selectively registrable with the aligned sight openings in the circular support and frame, and also having a plain sight opening therein registrable with the sight openings aforesaid separately from the cylindrical lenses when the latter are not in use, and actuator means attached to the circular support and projecting radially therefrom towards the margin of the cover plate, whereby to permit rotative adjustment of the circular support and bodily movement of the auxiliary lens carrier disc mounted thereon, to produce angular adjustment of the axes of the respective cylindrical lenses relative to the line of vision through the aforementioned aligned sight openings, when each cylindrical lens is registered with the sight openings.

2. Apparatus as defined in claim 1, wherein the circular support is provided with an annular shoulder, and the circular opening in the cover plate is provided with a complementary shoulder coacting with the shoulder on the circular support to prevent displacement of the circular support from its opening in the cover plate when the cover plate is secured to the frame.

3. Apparatus as defined in claim 1, wherein the actuator means for rotating the circular support includes yieldable detent means to releasably hold the circular support in various positions of rotative adjustment.

4. Apparatus as defined in claim 1, wherein the actuator means for rotating the circular support comprises a resilient lever having a detent projecting therefrom and coacting with cooperating stop means on the cover plate to releasably hold the circular support in various positions of rotative adjustment.

5. An attachment for ophthalmoscopes of the class described, comprising a cover plate adapted to be attached to the ophthalmoscope frame so as to lie over the usual rotatable spherical lens carrier disc, a circular rotary supporting member recessed in said cover plate and having a central sight opening therein aligning with the usual sight opening in the ophthalmoscope frame, when the cover plate is attached to the frame, an auxiliary lens carrier disc rotatably mounted on the circular supporting member aforesaid with its axis of rotation spaced to one side of the central axis of rotation of said circular supporting member, said auxiliary lens carrier disc being provided with a plurality of cylindrical lenses selectively registrable with the central sight opening in the circular supporting member, and also having a plain sight opening therein registrable with the sight opening in the circular supporting member separately from the cylindrical lenses, and actuator means attached to the circular supporting member and projecting radially therefrom towards the margin of the cover plate, whereby to permit angular adjustment of the axis of each cylindrical lens relative to and about the line of vision through the sight opening in the circular supporting member, when the respective cylindrical lenses are registered with said sight opening.

WILLIAM N. ALLYN.